US012200319B2

(12) United States Patent
Fuhrer et al.

(10) Patent No.: US 12,200,319 B2
(45) Date of Patent: *Jan. 14, 2025

(54) FLEXIBLE COMMERCIAL MONITORING

(71) Applicant: The Nielsen Company (US), LLC, New York, NY (US)

(72) Inventors: Brian Fuhrer, Palm Harbor, FL (US); Marie Kramer, Tarpon Springs, FL (US)

(73) Assignee: The Nielsen Company (US), LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/443,608

(22) Filed: Feb. 16, 2024

(65) Prior Publication Data
US 2024/0187708 A1 Jun. 6, 2024

Related U.S. Application Data

(63) Continuation of application No. 17/745,356, filed on May 16, 2022, now Pat. No. 11,910,069, which is a (Continued)

(51) Int. Cl.
H04N 21/8358 (2011.01)
H04H 60/31 (2008.01)
(Continued)

(52) U.S. Cl.
CPC ........ *H04N 21/8358* (2013.01); *H04H 60/31* (2013.01); *H04N 21/2547* (2013.01); *H04N 21/44204* (2013.01)

(58) Field of Classification Search
CPC .......... H04N 21/8358; H04N 21/2547; H04N 21/44204; H04N 21/4394; H04N 21/812;
(Continued)

(56) References Cited

U.S. PATENT DOCUMENTS

2011/0265117 A1* 10/2011 Cha ........................ H04H 60/32
725/35
2016/0150297 A1* 5/2016 Petrovic ........... H04N 21/23892
725/25
2018/0035174 A1 2/2018 Littlejohn

FOREIGN PATENT DOCUMENTS

WO 2009126164 A1 10/2009

* cited by examiner

Primary Examiner — Adil Ocak

(57) ABSTRACT

Methods, apparatus, systems and articles of manufacture (e.g., physical storage media) to implement flexible commercial monitoring for television audience measurement are disclosed. Example television audience measurement systems disclosed herein include a flexible commercial detector to detect whether a first watermark decoded from a television program broadcast signal is a bridge watermark that indicates a portion of the television broadcast signal including the bridge watermark is associated with a flexible commercial insertion event, the flexible commercial insertion event corresponding to insertion of a flexible commercial in the portion of the television broadcast signal. Disclosed example television audience measurement systems also include a commercial metric calculator to credit audience exposure associated with the portion of the television broadcast signal to a flexible commercial crediting metric in response to a determination that the first watermark is the bridge watermark.

20 Claims, 7 Drawing Sheets

Related U.S. Application Data continuation of application No. 16/635,107, filed as application No. PCT/US2019/063054 on Nov. 25, 2019, now Pat. No. 11,336,970.

(60) Provisional application No. 62/771,946, filed on Nov. 27, 2018.

(51) Int. Cl.
*H04N 21/2547* (2011.01)
*H04N 21/442* (2011.01)

(58) Field of Classification Search
CPC ....... H04N 21/44008; H04N 21/23892; H04N 21/44222; H04H 60/31; H04H 60/40; H04H 2201/50; H04H 60/56; H04H 60/66; G06Q 30/0242
USPC .......................................................... 725/31
See application file for complete search history.

FLEXIBLE COMMERCIAL MONITORING

CROSS-REFERENCE TO RELATED APPLICATIONS

This disclosure arises from a continuation of U.S. patent application Ser. No. 17/745,356 (now U.S. Pat. No. 11,910,069), which is titled "FLEXIBLE COMMERCIAL MONITORING," and which was filed on May 16, 2022, which is a continuation of U.S. patent application Ser. No. 16/635,107 (now U.S. Pat. No. 11,336,970), which is titled "FLEXIBLE COMMERCIAL MONITORING," and which was filed on Jan. 29, 2020, which corresponds to the U.S. national stage of International Patent Application No. PCT/US2019/063054, which is titled "FLEXIBLE COMMERCIAL MONITORING," and which was filed on Nov. 25, 2019, which claims the benefit of and priority to U.S. Provisional Application No. 62/771,946, which is titled "FLEXIBLE COMMERCIAL MONITORING," and which was filed on Nov. 27, 2018. U.S. patent application Ser. No. 17/745,356, U.S. patent application Ser. No. 16/635,107, International Patent Application No. PCT/US2019/063054 and U.S. Provisional Application No. 62/771,946 are hereby incorporated herein by reference in their respective entireties.

FIELD OF THE DISCLOSURE

This disclosure relates generally to television audience measurement and, more particularly, to flexible commercial monitoring for television audience measurement.

BACKGROUND

Television audience measurement includes determining ratings metrics quantifying audience exposure to television programs and commercials broadcast by television broadcasters. One such ratings metric is the average commercial minute (ACM), which is determined by duration weight averaging the minute-by-minute ratings over the total number of minutes of a television program broadcast during which commercials were broadcast.

BRIEF DESCRIPTION OF THE DRAWINGS

The figures are not to scale. In general, the same reference numbers will be used throughout the drawing(s) and accompanying written description to refer to the same or like parts, elements, etc.

Figure 1:
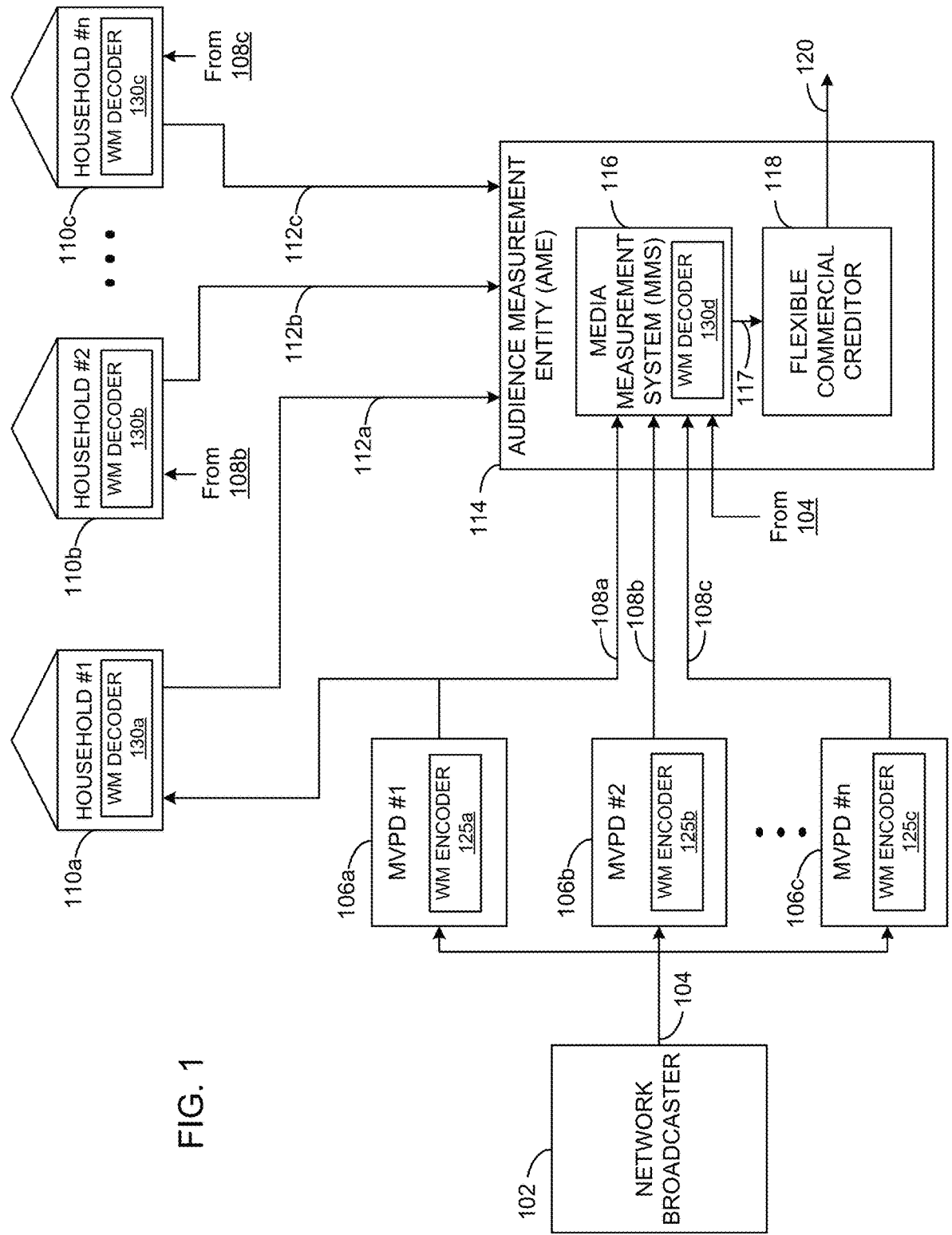
FIG. 1 is a block diagram of an example environment in which flexible commercial monitoring for television audience measurement can be implemented in accordance with teachings of this disclosure.

Descriptors "first," "second," "third," etc., are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Methods, apparatus, systems and articles of manufacture (e.g., physical storage media) to implement flexible commercial monitoring for television audience measurement are disclosed herein. Example television audience measurement systems disclosed herein include a watermark encoder to encode bridge watermarks in a portion of a television program broadcast corresponding to a gap in program content conveyed by the television program broadcast. For example, the gap in program content may correspond to a commercial included in the television program broadcast, a promotional spot included in the television program broadcast, etc. In some examples, the bridge watermarks may overlay other watermarks encoded in the portion of a television program broadcast corresponding to the gap in program content. For example, such other watermarks may include commercial watermarks used to identify a commercial broadcast in the gap in the program content. Disclosed example television audience measurement systems also include a watermark decoder to detect watermarks, including the bridge watermarks, encoded in the television program broadcast. Disclosed example television audience measurement systems further include a flexible commercial creditor to use the bridge watermarks to credit whether a flexible commercial was included in the portion of a television program broadcast corresponding to the gap in program content.

These and other example methods, apparatus, systems and articles of manufacture (e.g., physical storage media) to implement flexible commercial monitoring for television audience measurement are disclosed in further detail below.

Watermarking is a technique used to identify media such as television broadcasts, radio broadcasts, advertisements (television and/or radio), downloaded media, streaming media, prepackaged media, etc. Existing watermarking techniques identify media by embedding one or more codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media, identifying a characteristic of the media, or for another purpose such as tuning (e.g., a packet identifying header).

As used herein "media" refers to audio and/or visual (still or moving) content and/or advertisements. For example, as used herein, the term "media" includes any type of content and/or advertisement delivered via any type of distribution medium. Thus, media includes television programming or advertisements, radio programming or advertisements, movies, web sites, streaming media, etc. In some examples, to identify watermarked media, the watermark(s) are extracted and used to access a table of reference watermarks that are mapped to media identifying information.

In some examples, signatures may be utilized for identifying media. Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s)(e.g., the audio and/or video signals forming the media presentation being monitored). A signature may be a series of signatures collected in series over a timer interval. A good signature is approximately repeatable when processing the same media presentation, but has at least some unique characteristics relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

As noted above, television audience measurement includes determining ratings metrics quantifying audience exposure to television programs and commercials broadcast by television broadcasters. One such ratings metric is ACM, which is the average minute rating determined over the total number of minutes of a television program broadcast during which commercials were broadcast. An average minute rating represents an average size of an audience of a television program broadcast over a given period of time, such as averaged over each successive minute of the television program broadcast. Thus, the ACM metric represents the average size of the audience of the television program broadcast during the periods of time in which commercials were broadcast, referred to herein as commercial periods. In some examples, the ACM metric is determined by combining (e.g., averaging) the individual average minute ratings over all of the commercial periods in the given television program broadcast. Furthermore, in some examples, an overall program rating is determined for the given television program broadcast, which includes the program content and any commercial periods, whereas the ACM metric focuses on just the commercial periods.

Increasingly, national television broadcasters are looking to implement dynamic advertisement insertion (DAI) in linear (e.g., content as originally fed by the network, non-time-shifted) television broadcasts. For example, a national broadcaster may wish to replace a national commercial spot with dynamic local commercials targeted for different local viewing regions. As another example, a national broadcaster may wish to attract advertisers that cannot afford expensive commercial spots, such as commercial spots in broadcasts of National Football League (NFL) games, by dividing some national NFL spots into smaller spots that can be contracted on an ad-hoc basis. As another example, a national broadcaster may wish to replace a promotional spot (e.g., for promoting another television program during a current program's broadcast), which is not included in commercial ratings, with a DAI commercial. As another example, a national broadcaster may wish to replace a commercial spot with separate feeds for the different multichannel video programming distributors (MVPDs) and/or virtual MVPDs (vMVPDs) distributing the national broadcaster's national feed. For convenience, such DAI and other non-traditional commercials inserted in national television program broadcasts are referred to herein as "flexible commercials."

The ACM metric described above is tailored to monitoring exposure to national-level commercials (also referred to as national commercials) included in a national broadcast feed. The ACM metric is typically determined to account for live viewing of the national broadcast as well as for playback (e.g., via digital video recorders (DVRs)) over a subsequent 3-day period. Hence, the ACM metric is also referred to as the ACM/C3 metric or simply the C3 metric herein, where C3 refers to the 3-day measurement period (or C7 if the ads were sold for a 7 day window). In some examples, the ACM/C3 metric is determined using knowledge of the positions, or gaps, in a national television program broadcast that correspond to national commercials. For example, the positions of the national commercials in a national television program broadcast can be known through in-band signaling (e.g., cue tones, SCTE-35 codes, etc.) and/or watermarks identifying the national commercials.

ACM/C3 measurements are an important currency for use in selling and purchasing commercial spots in national television broadcasts. Thus, extending television audience measurement to support crediting of flexible commercials included in national television broadcasts should be done to ensure the accuracy of the existing ACM/C3 measurements is maintained while providing the ability to differentiate among the different components contributing to the ratings, e.g., such as by providing percent of coverage of each commercial. Crediting of flexible commercials should be agnostic to the type of broadcaster and, thus, provide equal opportunity crediting for television broadcasters, cable providers, syndicators, etc. Crediting of flexible commercials should also not result in a lost program audience (e.g., credited to all other tuning (AOT)) when existing smoothing rules are exceeded due to insertion of flexible commercials into the national television broadcast. For example, to avoid the "lost audience" problem, example television audience measurement systems disclosed herein may implement new smoothing rules such that if a gap in detected watermarks is observed in a portion of the national television broadcast that otherwise contained commercial watermarks (CCWM), then the smoothing rules allow commercial crediting to extend over that gap to account for the insertion of one or more flexible commercials even if the gap exceeds a first threshold (e.g., a 130 second threshold, or some other value) for cable networks, or a second threshold (e.g., a 90 second threshold, or some other value) for other broadcasters/distributers.

Example television audience measurement systems disclosed herein implement flexible commercial monitoring for television audience measurement in manners that achieve the technical goals described above. For example, disclosed example television audience measurement systems allow networks to overlay promotional spots with alternate advertising in the form of flexible commercials. The overlays can be done by the network, a technology company, an MVPD, etc. In some examples, the reporting of the flexible commercial spots would be via a new ratings data file separate from an ACM data file reporting AMC ratings, or an augmented ACM data file based on an augmented ACM media information tape (MIT) file format to report insertion of flexible commercials associated with the program telecasts that they air within. Using the ACM MIT file format supports ease of integration of the data by users. Note, the ACM MIT data file may be modified to report individual commercials. Furthermore, such an approach preserves the ACM/C3 fidelity because the flexible commercial audience estimates are reported separately from the regular ACM/C3 estimates. For example, ACM measurements typically exclude promotional spots from being counted as commercials. By reporting flexible commercial audience estimates separate from the ACM estimates, a flexible commercial overlaid in a promotional spot will not be included in the reported ACM estimate, thereby keeping the ACM estimate the same as if the flexible commercial had not been overlaid in the promotional spot. In some disclosed example television audience measurement systems, the crediting smoothing rules are updated to ensure that viewing minutes are properly attributed to the station or network and not to AOT when/if watermark encoding gaps are present for the flexible commercials.

As disclosed in further detail below, some example television audience measurement systems disclosed herein utilize a new bridge watermark that is encoded/watermarked on the flexible commercial spots being inserted by the station, network, content distributor. This new bridge watermark is used to identify that the gap in the program watermarks is commercial content to ensure that audience exposure (e.g., viewing) is properly credited to the program that the inserted flexible commercials aired within. For example, if 150 seconds of flexible commercials are inserted into a linear program on network X by the MVPD, the flexible commercials inserted by the MVPD can be encoded with bridge watermark(s). The audience measurement data received from panel households for this television broadcast would have linear watermarks identifying network X in the portion of the broadcast preceding the flexible commercials, followed by the bridge watermarks for the 150 seconds corresponding to the flexible commercials, followed by the linear watermarks identifying network X. The bridge watermarks indicate the broadcast material during that 150 seconds corresponded to flexible commercials, which allows the audience measurement system to credit audience exposure (e.g., viewing) during that 150 seconds of inserted commercials to the associated program. In some examples, to credit flexible commercial, the bridge watermark may be used in addition or as an alternative to updated smoothing rules.

Turning to the figures, FIG. 1 is a schematic diagram of an example environment 100 in which flexible commercial monitoring can be implemented in accordance with teachings of this disclosure. The example environment includes an example network broadcaster 102, an example network signal 104, example MVPDs 106a-c, example MVPD broadcast signals 108a-c, example households 110a-c, example media monitoring signals 112a-c, an example audience measurement entity (AME) 114, an example media measurement system (MMS) 116, an example flexible commercial creditor 118, and example commercial report data 120.

The example network broadcaster 102 of the illustrated example of FIG. 1 communicates media signals to the MVPDs 106a-c for distribution to a broad audience. In some examples, the network broadcaster 102 encodes watermarks (e.g., network codes) into media signals to enable subsequent tracking of the media signals as they are presented. In some examples, the network broadcaster 102 is a media distributor that receives media from content creators (e.g., television studios, movie studios, individual content creators, etc.) and distributes the media to a broader audience. In some examples, the AME 114 can directly access the network signal 104, which may be utilized as a reference signal for commercial detection. In some examples, the network broadcaster 102 is an internet-based broadcaster (e.g., providing streaming media content). In some examples, the network broadcaster 102 is a national television network broadcaster.

The example network signal 104 of the illustrated example of FIG. 1 is communicated by the network broadcaster 102 to the MVPDs 106a-c. In some examples, the network signal 104 includes network watermarks that can be detected at the AME 114 (e.g., by the flexible commercial creditor 118). In some examples, the network watermarks are embedded periodically in broadcast media (e.g., a broadcast program) and can include a source identifier (SID) of the network broadcaster 102 and broadcast timestamps corresponding to the broadcast time represented by the watermark. Additionally or alternatively, the network watermarks can include program identifiers to identify the program included in the network signal 104, commercial identifiers to identify a national commercial included in the network signal 104, etc. The network signal 104 is received by the MVPDs 106a-c, which can replace (or, in other words, overlay) portions of the network signal 104 with flexible commercials (e.g., locally-targeted commercials, dynamic advertisements, etc.) for broadcast to a particular audience. The network signal 104 may include video and/or audio media.

The portions of the network signal 104 that can be replaced by the MVPDs 106a-c with one or more flexible commercials are also referred to as flexible commercial insertion opportunities. In some examples, flexible commercial insertion opportunities correspond to one or more commercial spots (e.g., a 15 second spot, 30 second spot) set aside in a larger commercial pod (e.g., corresponding to a set of commercial spots in which commercials are to be broadcast during a break in the broadcast program). Additionally or alternatively, in some examples, the flexible commercial insertion opportunities correspond to promotional spots set aside in the national signal 104, which can otherwise be used to promote another program during a current program's broadcast The network broadcaster 102 can identify flexible commercial insertion opportunities to the MVPDs 106a-c using one or a combination of several possible techniques. In some examples, the network broadcaster 102 may utilize cue tones to indicate flexible commercial insertion opportunities in the network signal 104. Cue tones are signals inserted into the national signal 104 that are identifiable by the MVPDs 106a-c. A cue tone may be, for example, a dual-tone multi-frequency (DTMF) tone. In some examples, an MVPD 106a-c can identify and detect the cue tones in signals to identify flexible commercial insertion opportunities. In some examples, the identification may be in the form of Society of Cable Telecommunication Engineers—Standard 35 (SCTE-35) codes. SCTE-35 codes are a digital form of indicator which, similar to cue tones, can be included in the national signal 104, and can be used to indicate flexible commercial insertion opportunities. An MVPDs 106a-c can identify and detect SCTE-35 codes or cue tones in the national signal 104 to identify flexible commercial insertion opportunities. In some examples, the network broadcaster 102 may transmit a signal included in the national signal 104 in white space (e.g., unused frequencies, etc.) of the national signal 104. In such an example, an MVPDs 106a-c can detect the white space signal to identify flexible commercial insertion opportunities. In some examples, the network broadcaster 102 may communicate with the MVPDs 106a-c via email and/or some other communication to identify the flexible commercial insertion opportunities in the national signal 104.

The MVPDs 106a-c of the illustrated example of FIG. 1 broadcast media to viewers/listeners. The MVPDs 106a-c transmit the MVPD signals 108a-c. The MVPDs 106a-c may transmit the MVPD signals 108a-c to a specific area (e.g., via antenna transmission technology, via cable distribution, via satellite transmission technology, via the Internet, etc.).

The MVPD signals 108a-c of the illustrated example of FIG. 1 include at least portions of the network signal 104. In some examples in which one or more of the MVPDs 106a-c do not interrupt the network signal 104 with flexible commercials, the MVPD signals 108a-c are identical to the network signal 104. In some examples, portions of the network signal 104 are replaced with one or more flexible commercials selected for insertion by the one or more of the MVPDs 106a-c (e.g., into one or more identified flexible commercial insertion opportunities). The MVPDs 106a-c may be accessible to viewers in different areas. For example, the first MVPD 106a may broadcast in the Louisville area, the second MVPD 106b may broadcast in the Philadelphia area, etc. In the illustrated example of FIG. 1, the first household 110a is able to access the first MVPD signal 108a from the first MVPD 106a.

In the illustrated example, the MVPDs 106a-c include respective example watermark encoders 125a-c to insert bridge watermarks to indicate a flexible commercial has been inserted into an identified flexible commercial insertion opportunity of the national signal 104. For example, if the MVPD 106a decides to insert a flexible commercial into a flexible commercial spot or promotional spot identified in the national signal 104 (e.g., also referred to as a flexible commercial insertion event), the MVPD 106a activates its watermark encoder 125a to encode bridge watermarks into the portion of its MVPD signal 108a corresponding to the flexible commercial insertion event. In some examples, the bridge watermarks encoded into the portion of the MVPD signal 108a corresponding to a flexible commercial may be in addition to other watermark(s) encoded in the flexible commercial. For example, the flexible commercial may be encoded with watermarks to identify the flexible commercial. In some such examples, the watermark encoder 125a may encode the bridge watermarks to co-exist with the commercial identifying watermarks already embedded in the flexible commercial. For example, the commercial identifying watermarks may be encoded in a first watermarking layer defined by a first set of audio frequencies used to encode the commercial identifying watermarks, whereas the bridge watermarks are encoded in a different, second watermarking layer defined by a different, second set of audio frequencies used to encode the bridge watermarks. In some examples, a bridge watermark includes a type value to indicate that the watermark corresponds to a flexible watermark insertion event, but the bridge watermark does not identify the flexible commercial itself. In some examples, the type value of the bridge watermark may be a generic value that is the same for multiple different national broadcasters, MVPDs, etc. In some examples, the type value of a bridge watermark may be tied to a specific national broadcaster, MVPD, etc., such that bridge watermarks can be associated with their corresponding broadcaster, MVPD, etc. In some example, the bridge watermark may include a timestamp to represent a time of the bridge watermark in the MVPD signal 108a. In some examples, the watermark encoder 125a inserts the bridge watermarks throughout the portion of the MVPD signal 108a corresponding to the flexible watermark insertion event (e.g., periodically based on a watermark encoding period/interval) such that the type values of the bridge watermarks are the same throughout the flexible watermark insertion event, but the timestamps of the bridge watermarks increment throughout the flexible watermark insertion event and can be used, for example, to determine the duration of the flexible watermark insertion event.

In some examples, the flexible commercials are provided to the MVPDs 106a-c such that the flexible commercials are already pre-encoded with bridge watermarks. For example, the flexible commercials could be pre-encoded with bridge watermarks having the generic type identifier described above. In some such examples, the watermark encoders 125a-c may be omitted from the MVPDs 106a-c.

The households 110a-c of the illustrated example of FIG. 1 represent locations at which media is accessed. In some examples, the households 110a-c are not physical locations, but instead represent devices which may access media signals (e.g., a smartphone, a radio, etc.). In some examples, the households 110a-c may include monitoring devices utilized by the AME 114 to detect and/or identify media presented at the households 110a-c. For example, one or more of the households 110a-c may correspond to panelist households. Panelists are users registered on panels maintained by a ratings entity (e.g., an audience measurement company) that owns and/or operates the ratings entity subsystem. In the illustrated examples, the households 110a-c communicate the media monitoring signals 112a-c to the AME 114. In some examples, the media monitoring signals 112a-c are communicated from a monitoring device (e.g., a personal media monitor device) at the households 110a-c to the AME 114. In the illustrated example, the first household 110a accesses the first MVPD signal 108a from the MVPD 106a, the second household 110b accesses the second MVPD signal 108b from the MVPD 106b, and the third household 110c accesses the third MVPD signal 108c from the MVPD 106c. However, in other examples, different groups of the households may access MVPD signals from corresponding different MVPDs or combinations of MVPDs.

The example media monitoring signals 112a-c of the illustrated example of FIG. 1 represent media and/or data pertaining to media exposure at the households 110a-c. For example, media monitoring devices may record or otherwise collect data on media that is presented in a respective household, transmitting such data as the media monitoring signals 112a-c to the AME 114. In the illustrated example, the households 110a-c include respective example watermark decoders 130a-c to decode watermarks embedded in the MVPD signals 108a-c and to include the decoded watermarks in the respective media monitoring signals 112a-c. For example, the watermark decoder 130a at the household 110a decodes watermarks embedded in the MVPD signal 108a. Such watermarks can include, for example, network watermarks identifying the networks, programs and network commercials conveyed in the MVPD signal 108a, commercial identifying watermarks identifying flexible commercial(s), if any, inserted in the MVPD signal 108a, bridge watermarks identifying gaps (e.g., flexible commercial insertion opportunities), if any, of the MVPD signal 108a in which flexible commercial(s) have been inserted, etc.

The example AME 114 of the illustrated example of FIG. 1 accesses the media monitoring signals 112a-c to determine media metrics (e.g., viewership, reach, etc.). The AME 114 of the illustrated example includes the MMS 116 and the flexible commercial creditor 118.

The MMS 116 of the illustrated example of FIG. 1 accesses the MVPD signals 108a-c. The MMS 116 may include one or more locations configured to access a plurality of media signals to enable broad media monitoring by the AME 114. In some examples, the MMS 116 may be equipped with long-distance receiving equipment to access media signals in other localities (e.g., to access MVPD signals from MVPDs that are not local to the MMS 116). In some examples, the MMS 116 includes multiple systems at different locations, positioned to access as many different media signals as possible. In some examples, the MMS 116 accesses the network signal 104 directly. The MMS 116 communicates example media monitoring data 117 (e.g., watermarks, signatures, etc.) to the flexible commercial creditor 118 to be utilized for flexible commercial monitoring.

In the illustrated example, the MMS 116 includes an example watermark decoder 130d to decode watermarks embedded in the MVPD signals 108a-c and/or the network signal 104 for inclusion in the media monitoring data 117. Such watermarks can include, for example, network watermarks identifying the network, programs and network commercials conveyed in the MVPD signals 108a-c and/or the network signal 104, commercial identifying watermarks identifying flexible commercial(s), if any, inserted in the MVPD signals 108a-c, bridge watermarks identifying gaps (e.g., flexible commercial insertion opportunities), if any, of the MVPD signals 108a-c in which flexible commercial(s) have been inserted, etc. In some examples, the MMS 116 also includes watermarks reported by the watermark decoders 130a-c of the respective households 110a-c in the media monitoring data 117.

The example flexible commercial creditor 118 of the illustrated example of FIG. 1 credits flexible commercials inserted in the MVPD signals 108a-c based on the media monitoring data 117. In some examples, the flexible commercial creditor 118 accesses the watermarks included in media monitoring data 117 to perform flexible commercial monitoring, as well as conventional commercial monitoring (e.g., to determine ACM/C3 ratings). A block diagram illustrating an example implementation of the flexible commercial creditor 118 is provided in FIG. 2, which is described in further detail below.

The commercial report data 120 of the illustrated example of FIG. 1 is an output of the flexible commercial creditor 118 including indications of flexible commercials detected in the MVPD signals 108a-c. In some examples, the commercial report data 120 may be communicated by the AME 114 to the network broadcaster 102 to inform the network broadcaster 102 of periods of the network signal 104 in which flexible commercials were inserted in the corresponding MVPD signals 108a-c, report flexible commercial crediting metric(s) associated with the flexible commercials, etc. For example, the commercial report data 120 may be in the form of one or more ACM MIT files augmented to support crediting of flexible commercials.

Figure 2:
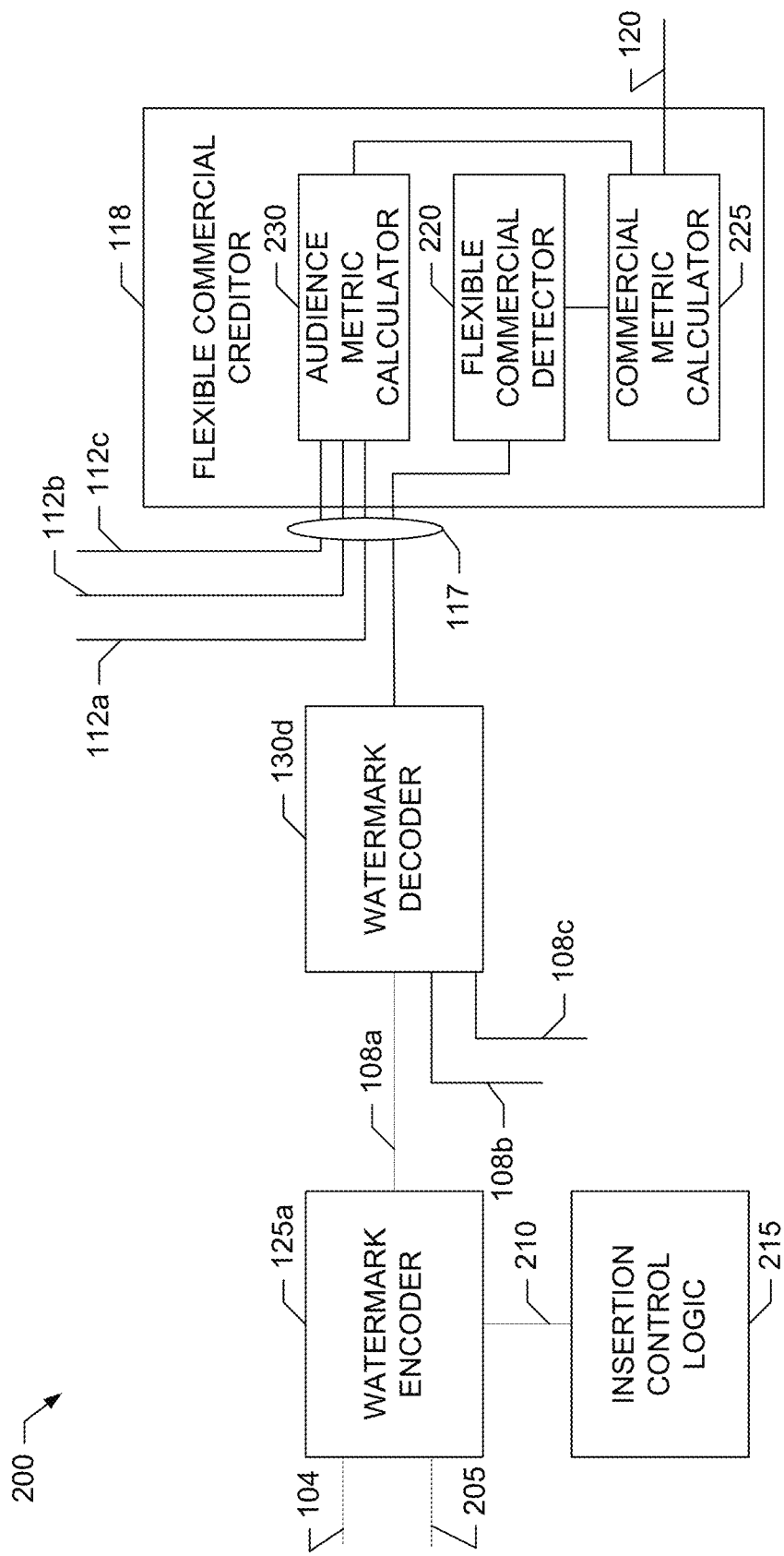
FIG. 2 is a block diagram of an example television audience measurement system for implementing flexible commercial monitoring in the environment of FIG. 1 in accordance with teachings of this disclosure

A block diagram of an example television audience measurement system 200 implementing flexible commercial monitoring for television audience measurement in accordance with teachings of this disclosure is illustrated in FIG. 2. The example television audience measurement system 200 corresponds to a simplified view of the example environment 100 of FIG. 1. In particular, the example television audience measurement system 200 includes the example watermark encoder 125a of the MVPD 106a, the example watermark decoder 130d of the MMS 116, and the example flexible commercial creditor 118. However, in at least some examples, the description of the watermark encoder 125a provided in association with FIG. 2 also applies to the watermark encoders 125b and 125c described above. Likewise, in at least some examples, the description of the watermark decoder 130d provided in association with FIG. 2 also applies to the watermark decoders 130a, 130b and 130c described above.

Turning to FIG. 2, the watermark encoder 125a of the illustrated example is to encode bridge watermarks in a portion of the MVPD signal 108a (e.g., and/or other television program broadcast) corresponding to a gap in program content conveyed by the MVPD signal 108a during which a flexible commercial has been inserted. For example, the gap in program content may correspond to a flexible commercial spot identified in the national television program broadcast corresponding to the MVPD signal 108a, a promotional spot identified in the national program broadcast, etc. In some examples, the bridge watermarks may overlay other watermarks encoded in the portion of a television program broadcast corresponding to the gap in program content. For example, such other watermarks may include commercial watermarks used to identify a flexible commercial broadcast in the gap in the program content.

In the illustrated example of FIG. 2, the watermark encoder 125a accepts as input the national signal 104 that is used to generate the example MVPD signal 108a, as well as any example flexible commercials 205 to be inserted in the local commercial insertion opportunities identified in the national signal 104. The watermark encoder 125a also accepts as input an example insertion control signal 210, which is activated by example insertion control logic 215 at the MVPD 106a when the portion of the pre-watermarked MVPD signal 108a being applied to the watermark encoder 125a corresponds to the flexible commercial. In the illustrated example, the insertion control logic 215 identifies local commercial insertion opportunities in the national signal 104, and activates the insertion control signal 210 during those local commercial insertion opportunities, if any, the MVPD 106a decides to actually insert flexible commercials. As described in further detail above, the insertion control logic 215 can identify such local commercial insertion opportunities in the national signal 104 based on one or a combination of cue tones included in the national signal 104, SCTE-35 codes included in the national signal 104, white space signals included in the national signal 104, watermarks included in the national signal 104, email and/or other out-of-band communications, etc.

When the insertion control signal 210 is activated, the watermark encoder 125a of the illustrated example encodes the bridge watermarks in the portion of the MVPD signal 108a corresponding to the flexible commercial insertion event indicated by the activated insertion control signal 210. As described above, the watermark encoder 125a may encode the bridge watermarks to co-exist with any commercial identifying watermarks already embedded in the flexible commercial 205 corresponding to the active flexible commercial insertion event. For example, as described above, the commercial identifying watermarks may be encoded in a first watermarking layer defined by a first set of audio frequencies used to encode the commercial identifying watermarks, whereas the bridge watermarks are encoded in a different, second watermarking layer defined by a different, second set of audio frequencies used to encode the bridge watermarks. In the illustrated example, the watermark encoder 125a encodes bridge watermarks periodically (e.g., based on a watermark encoding period/interval) throughout the active flexible commercial insertion event represented by the active insertion control signal 210. For example, each of the bridge watermarks may include a same type value to indicate that the watermark corresponds to a flexible watermark insertion event, but which does not identify the flexible commercial 205 itself. In some examples, the type value of the bridge watermark may be a generic value that is the same for multiple different national broadcasters, MVPDs, etc., whereas in other examples, the type value of a bridge watermark may be tied to a specific national broadcaster, MVPD, etc., such that bridge watermarks can be associated with their corresponding broadcaster, MVPD, etc. Each of the bridge watermarks may also include a timestamp, which is incremented in each successive bridge watermark encoded in the portion of the MVPD signal 108a corresponding to the active flexible watermark insertion event.

The watermark decoder 130d of the illustrated example is to detect watermarks, including the bridge watermarks, encoded in the MVPD signals 108a-c (e.g., and/or other television program broadcasts from different sources). Further examples of watermark encoding techniques that may be implemented by the example watermark encoder 125a, and corresponding example watermark detection techniques that may be implemented by the example watermark decoder 130d, are described in U.S. Pat. No. 8,359,205, entitled "Methods and Apparatus to Perform Audio Watermarking and Watermark Detection and Extraction," which issued on Jan. 22, 2013, U.S. Pat. No. 8,369,972, entitled "Methods and Apparatus to Perform Audio Watermarking Detection and Extraction," which issued on Feb. 5, 2013, U.S. Publication No. 2010/0223062, entitled "Methods and Apparatus to Perform Audio Watermarking and Watermark Detection and Extraction," which was published on Sep. 2, 2010, U.S. Pat. No. 6,871,180, entitled "Decoding of Information in Audio Signals," which issued on Mar. 22, 2005, U.S. Pat. No. 5,764,763, entitled "Apparatus and Methods for Including Codes in Audio Signals and Decoding," which issued on Jun. 9, 1998, U.S. Pat. No. 5,574,962, entitled "Method and Apparatus for Automatically Identifying a Program Including a Sound Signal," which issued on Nov. 12, 1996, U.S. Pat. No. 5,581,800, entitled "Method and Apparatus for Automatically Identifying a Program Including a Sound Signal," which issued on Dec. 3, 1996, U.S. Pat. No. 5,787,334, entitled "Method and Apparatus for Automatically Identifying a Program Including a Sound Signal," which issued on Jul. 28, 1998, and U.S. Pat. No. 5,450,490, entitled "Apparatus and Methods for Including Codes in Audio Signals and Decoding," which issued on Sep. 12, 1995, all of which are hereby incorporated by reference in their entireties. U.S. Pat. Nos. 8,359,205, 8,369,972, U.S. Publication No. 2010/0223062, U.S. Pat. Nos. 6,871,180, 5,764,763, 5,574,962, 5,581,800, 5,787,334 and 5,450,490 describe example watermarking systems in which a watermark is included in an audio signal by manipulating a set of frequencies of the audio signal.

The flexible commercial creditor 118 of the illustrated example performs commercial monitoring associated with the national signal 104. In the illustrated example, the flexible commercial creditor 118 uses the bridge watermarks detected in the monitored MVPD signals 108a-c to credit whether flexible commercial were included in the portions of the monitored MVPD signals 108a-c corresponding to the gaps in program content. For example, the flexible commercial creditor 118 of FIG. 2 includes an example flexible commercial detector 220 to detect portions of the different monitored MVPD signals 108a-c associated with flexible commercial insertion events based on the bridge watermarks included in the media monitoring data 117. By way of example, if the flexible commercial detector 220 determines that a given portion of the MVPD signal 108a (e.g., corresponding to a particular minute interval or some other duration of the signal) includes bridge watermarks as indicated by the media monitoring data 117 obtained from the watermark decoder 130, the flexible commercial detector 220 associates that portion of the MVPD signal 108a with a flexible commercial insertion event. For example, the flexible commercial detector 220 can detect the bridge watermarks by evaluating the type value included in a decoded watermark to determine whether the decoded watermark is a bridge watermark or some other watermark (e.g., such as a program watermark, a commercial watermark, etc.). In some examples, the flexible commercial detector 220 determines the duration of the portion of the MVPD signal 108a associated with the flexible commercial insertion event based on the timestamps of the bridge watermarks decoded from that portion of the MVPD signal 108a (e.g., based on a difference in the timestamps of an ending bridge watermark and a starting bridge watermark included in the portion of the MVPD signal 108a). Conversely, if the flexible commercial detector 220 determines that the given portion of the MVPD signal 108a does not include bridge watermarks as indicated by the media monitoring data 117 obtained from the watermark decoder 130, the flexible commercial detector 220 associates that portion of the MVPD signal 108a with program content, a network commercial, all other tuning, etc., based on existing media crediting techniques.

In the flexible commercial creditor 118 of the illustrated example, the flexible commercial detector 220 uses its detections of flexible commercial insertion events to control an example commercial metric calculator 225. For example, based on the detections of flexible commercial insertion events provided by the flexible commercial detector 220, the commercial metric calculator 225 determines whether to assign audience metrics for given portions of the different monitored MVPD signals 108a-c (e.g., corresponding to successive minute intervals or some other duration of the signals) to a flexible commercial crediting metric which credits audience exposure to flexible commercials associated with given program, or to one or more other crediting metrics, such as the ACM/C3 metric for national commercials described above.

In the illustrated example, the audience metrics are determined by an example audience metric calculator 230 from the media monitoring signals 112a-c reported by the example households 110a-c. For example, the audience metric calculator 230 may process the media monitoring signals 112a-c reported by the example households 110a-c to estimate audience sizes for given portions of the different monitored MVPD signals 108a-c (e.g., corresponding to successive minute intervals or some other duration of the signals). Such audience metrics can correspond to an audience ratings metric that represents a percentage of households exposed to a given portion of media (e.g., a given minute of a monitored MVPD signal 108a-c), an audience reach metric that represents a number of households exposed to a given portion of media (e.g., a given minute of a monitored MVPD signal 108a-c), etc.

In some examples, the commercial metric calculator 225 averages the flexible commercial crediting metrics determined, based on the bridge watermarks, to be associated with flexible commercial events across the different monitored MVPD signals 108a-c to determine an average flexible commercial crediting metric for a group of flexible commercials inserted in a given program included in the national signal 104. If the flexible commercials also include identifying watermark (or are otherwise identifiable, e.g., via signatures), the commercial metric calculator 225 can additionally or alternatively determine flexible commercial crediting metrics for individual ones of the flexible commercials inserted in a given program conveyed by the national signal 104. In some examples, the commercial metric calculator 225 also determines a conventional ACM/C3 metric from portions of the different monitored MVPD signals 108a-c determined to be associated with commercials (e.g., based on the detection of network commercial watermarks in those signal portions, the lack of program content watermarks in those signal portions, etc.) but that do not include bridge watermarks.

While an example manner of implementing the audience measurement system 200 is illustrated in FIGS. 1 and 2, one or more of the elements, processes and/or devices illustrated in FIGS. 1 and 2 may be combined, divided, re-arranged, omitted, eliminated and/or implemented in any other way. Further, the example watermark encoders 125a-c, the example watermark decoders 130a-d, the example flexible commercial creditor 118, the example insertion control logic 215, the example flexible commercial detector 220, the example commercial metric calculator 225, the example audience metric calculator 230 and/or, more generally, the example audience measurement system 200 of FIG. 1 may be implemented by hardware, software, firmware and/or any combination of hardware, software and/or firmware. Thus, for example, any of the example watermark encoders 125a-c, the example watermark decoders 130a-d, the example flexible commercial creditor 118, the example insertion control logic 215, the example flexible commercial detector 220, the example commercial metric calculator 225, the example audience metric calculator 230 and/or, more generally, the example audience measurement system 200 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate arrays (FPGAs) and/or field programmable logic device(s) (FPLD(s)). When reading any of the apparatus or system claims of this patent to cover a purely software and/or firmware implementation, at least one of the example audience measurement system 200, the example watermark encoders 125a-c, the example watermark decoders 130a-d, the example flexible commercial creditor 118, the example insertion control logic 215, the example flexible commercial detector 220, the example commercial metric calculator 225 and/or the example audience metric calculator 230 is/are hereby expressly defined to include a non-transitory computer readable storage device or storage disk such as a memory, a digital versatile disk (DVD), a compact disk (CD), a Blu-ray disk, etc. including the software and/or firmware. Further still, the example audience measurement system 200 may include one or more elements, processes and/or devices in addition to, or instead of, those illustrated in FIGS. 1-2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
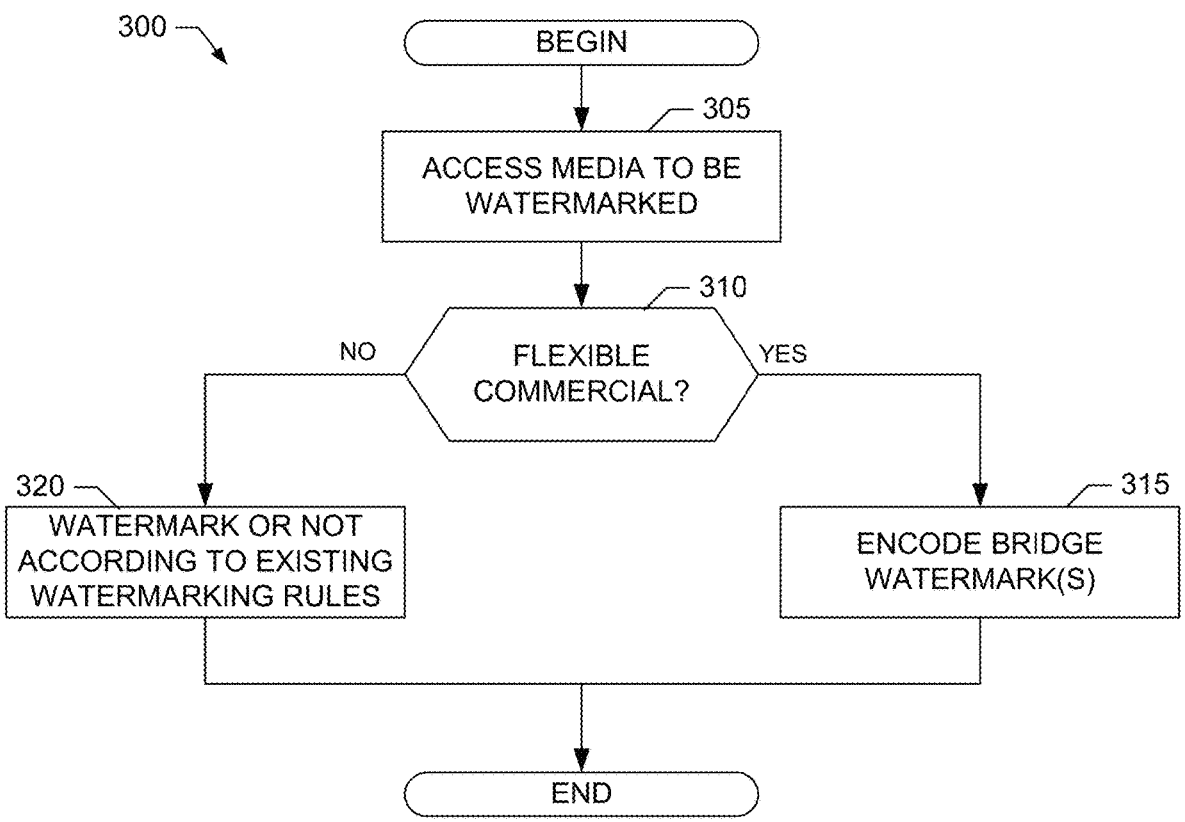
FIG. 3 is a flowchart representative of example computer readable instructions that may be executed to implement an example watermark encoder included in the example television audience measurement system of FIG. 2.
Figure 4:
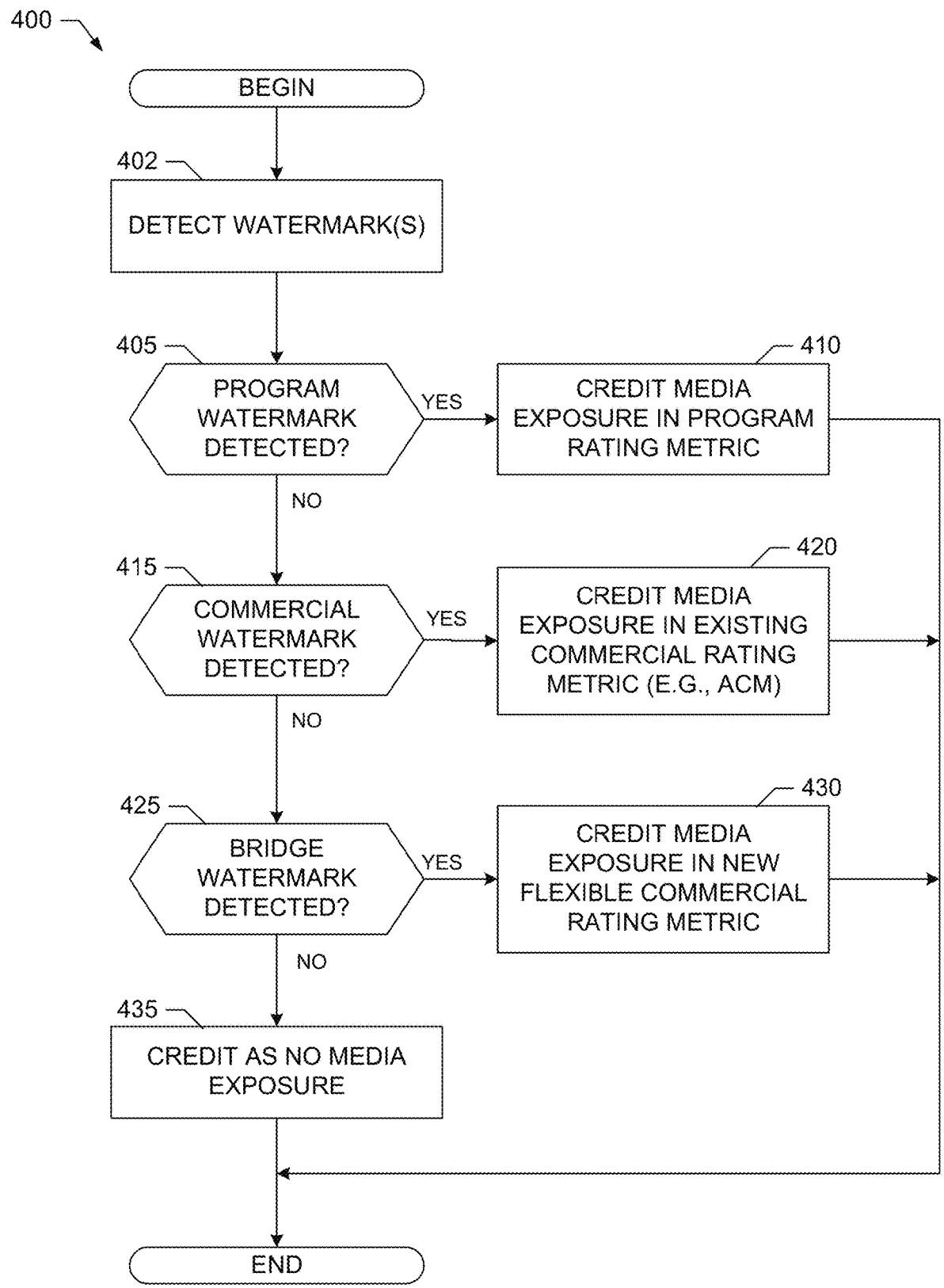
FIG. 4 is a flowchart representative of first example computer readable instructions that may be executed to implement an example flexible commercial creditor included in the example television audience measurement system of FIG. 2.
Figure 5:
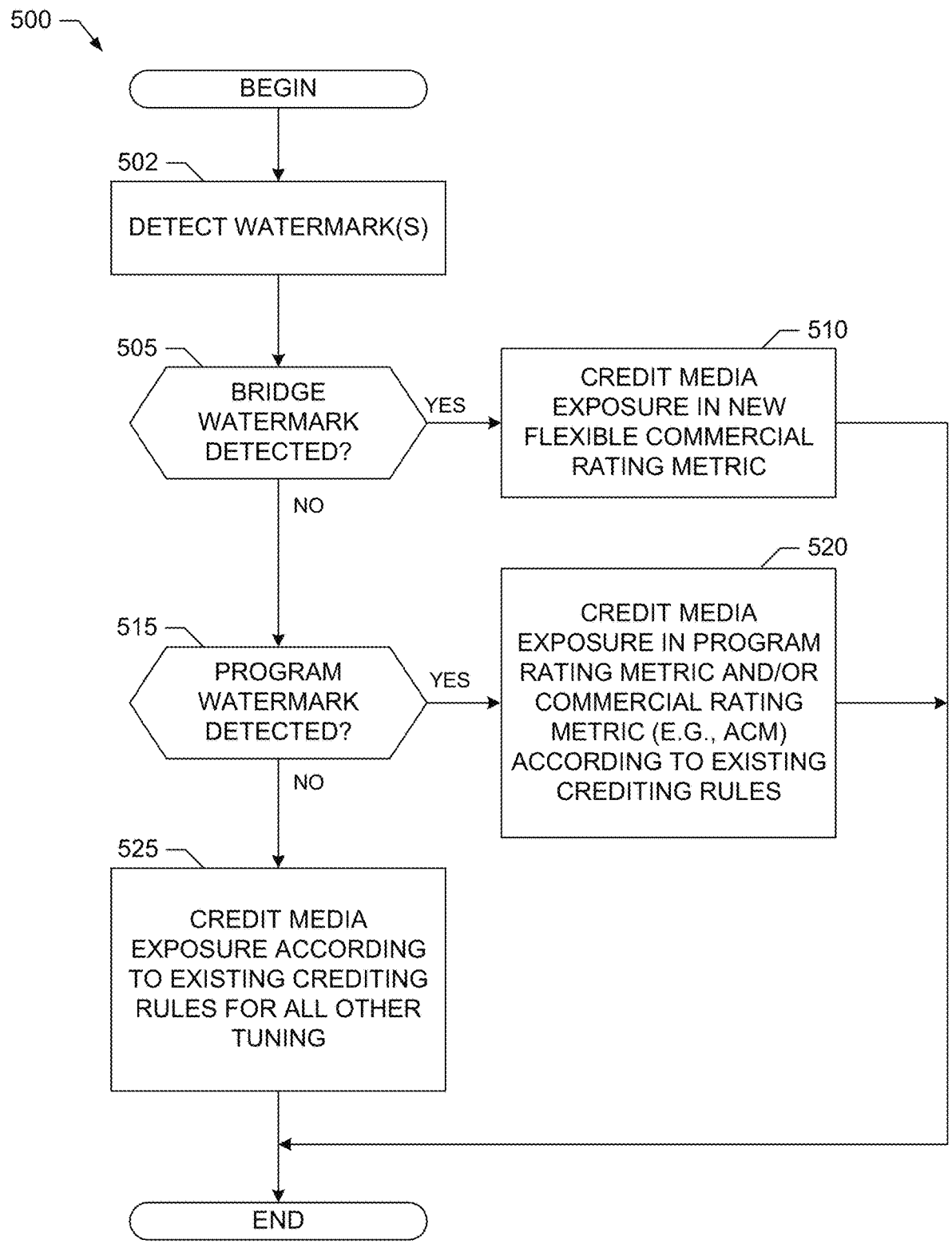
FIG. 5 is a flowchart representative of second example computer readable instructions that may be executed to implement the example flexible commercial creditor included in the example television audience measurement system of FIG. 2.

Flowcharts representative of example hardware logic, machine readable instructions, hardware implemented state machines, and/or any combination thereof for implementing the example audience measurement system 200 are shown in FIGS. 3-5. In these examples, the machine readable instructions may be one or more executable programs or portion(s) thereof for execution by a computer processor, such as the processors 12 and/or 712 shown in the example processor platforms 00 and 700 discussed below in connection with FIG. 7. The one or more programs, or portion(s) thereof, may be embodied in software stored on a non-transitory computer readable storage medium such as a CD-ROM, a floppy disk, a hard drive, a DVD, a Blu-ray Disk™, or a memory associated with the processor(s) 12 and/or 712, but the entire program or programs and/or parts thereof could alternatively be executed by a device other than the processor(s) 12 and/or 712, and/or embodied in firmware or dedicated hardware. Further, although the example program(s) is(are) described with reference to the flowcharts illustrated in FIGS. 3-5, many other methods of implementing the example audience measurement system 200 may alternatively be used. For example, with reference to the flowcharts illustrated in FIGS. 3-5, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 3-5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. Also, as used herein, the terms "computer readable" and "machine readable" are considered equivalent unless indicated otherwise.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

An example program 300 that may be executed to implement the example watermark encoder 125a of the example television audience measurement system 200 of FIG. 3 is represented by the flowchart shown in FIG. 3. However, the example program 300 may also be used to implement the example watermark encoders 125b and/or 125c described above. With reference to the preceding figure and written description, the example program 300 of FIG. 2 begins execution at block 305 at which the watermark encoder 125a accesses media to be watermarked and included in a television program broadcast (e.g., corresponding to the MVPD signal 108a. If the example insertion control logic 215 determines, as described above, that media corresponds to a flexible commercial (block 310), at block 315 the watermark encoder 125a encodes bridge watermarks into the media, as described above. If the insertion control logic 215 determines, as described above, that the media does not correspond to a flexible commercial (block 310), at block 320 the watermark encoder 125a performs watermarking according to existing watermarking rules. For example, if the media corresponds to program content, then the watermark encoder 125a may encode program watermarks containing source identifiers (SIDs), program identifiers (PIDs), etc., into the media. In some examples, if the media corresponds to a commercial, then the watermark encoder 125a may encode commercial watermarks containing commercial identifiers into the media, or the watermark encoder 125a may leave the media unwatermarked. In some examples, the program watermarks correspond to network watermarks containing an SID to identify the particular network broadcaster 102 associated with the national signal 104. In some such examples, any media content conveyed by the national signal 104, such as program content as well as commercials, is encoded with the program watermarks associated with that network broadcaster.

In some examples, the watermark encoder 125a may continuously encode bridge watermarks in the media being broadcast regardless of the type of media such that the bridge watermarks are overlaid with other watermarks, if present. In such examples, the presence of just bridge watermarks (with no other overlaid watermarks) in a given portion of monitored media can be used to indicate that the given media portion likely corresponds to a flexible commercial inserted in that monitored television broadcast.

Some audience measurement systems employ different types of meters such that one type of meter is able to detect program watermarks and commercial watermarks, but another type of meter may be able to detect program watermarks but not commercial watermarks, which may occur if the different types of meters use different watermark detection technologies. In such examples, the bridge watermarks encoded by the watermark encoder 125a could correspond to a type of watermark that is detectable by multiple, or all, types of meters used in the audience measurement system.

A first example program 400 that may be executed to implement the example flexible commercial creditor 118 of the television audience measurement system 200 of FIG. 2 is represented by the flowchart shown in FIG. 4. With reference to the preceding figure and written description, the example program 400 of FIG. 4 begins execution at block 402 at which the example watermark decoder 130d detects watermarks in a television program broadcast (e.g., corresponding to one or more of the monitored MVPD signals 108a-c). If the watermark decoder 130d detects program watermarks in a given portion of the monitored television program broadcast (block 405), at block 410 the flexible commercial creditor 118 credits audience exposure to the given portion of the monitored television program broadcast in a program rating metric. If the watermark decoder 130d detects commercial watermarks in the given portion of the monitored television program broadcast (block 415), at block 420 the flexible commercial creditor 118 credits audience exposure to the given portion of the monitored television program broadcast in an existing ACM rating metric. If the watermark decoder 130d detects just bridge watermarks in the given portion of the monitored television program broadcast (block 425), at block 430 the flexible commercial creditor 118 credits audience exposure to the given portion of the monitored television program broadcast in a new flexible commercial rating metric. If the watermark decoder 130d does not detect any watermarks in the monitored portion of the monitored television program broadcast (block 425), the flexible commercial creditor 118 credits no audience exposure for the given portion of the monitored television program broadcast.

A second example program 500 that may be executed to implement the example flexible commercial creditor 118 of the television audience measurement system 200 of FIG. 2 is represented by the flowchart shown in FIG. 5. With reference to the preceding figure and written description, the example program 500 of FIG. 5 begins execution at block 502 at which the example watermark decoder 130d detects watermarks in a television program broadcast (e.g., corresponding to one or more of the monitored MVPD signals 108a-c). If the watermark decoder 130d detects bridge watermarks in a given portion of the monitored television program broadcast (block 505), at block 510 the flexible commercial creditor 118 credits audience exposure to the given portion of the monitored television program broadcast in a new flexible commercial rating metric. If the watermark decoder 130d detects program watermarks in the given portion of the monitored television program broadcast (block 515), at block 520 the flexible commercial creditor 118 credits audience exposure to the given portion of the monitored television program broadcast in a program rating metric and/or a commercial rating metric according to existing crediting rules, such as existing rules to determine ACM/C3 metrics. For example, if the program watermarks are network watermarks containing the SID of the network broadcaster 102, and the program watermarks are embedded in both the programs and commercials conveyed by the national signal 104, at block 520 existing crediting rules will be applied to credit audience exposure appropriately. Otherwise, if the watermark decoder 130d detects no bridge watermarks and no program watermarks in the given portion of the monitored television program broadcast, at block 525 the flexible commercial creditor 118 credits audience exposure to the given portion of the monitored television program broadcast according to existing crediting rules for all other tuning.

FIG. is a block diagram of an example processor platform 00 structured to execute the instructions of FIGS. 4 and/or 5 to implement the example flexible commercial creditor 118 of the example audience measurement system 200 of FIG. 2. The processor platform 00 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box a digital camera, a headset or other wearable device, or any other type of computing device.

The processor platform 00 of the illustrated example includes a processor 12. The processor 12 of the illustrated example is hardware. For example, the processor 12 can be implemented by one or more integrated circuits, logic circuits, microprocessors, GPUs, DSPs, or controllers from any desired family or manufacturer. The hardware processor 12 may be a semiconductor based (e.g., silicon based) device. In the illustrated example, the processor 612 implements the example flexible commercial detector 220, the example commercial metric calculator 225 and the example audience metric calculator 230.

The processor 12 of the illustrated example includes a local memory 13 (e.g., a cache). The processor 12 of the illustrated example is in communication with a main memory including a volatile memory 14 and a non-volatile memory 16 via a link 18. The link 18 may be implemented by a bus, one or more point-to-point connections, etc., or a combination thereof. The volatile memory 14 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 16 may be implemented by flash memory and/or any other desired type of memory device. Access to the main memory 14, 16 is controlled by a memory controller.

The processor platform 00 of the illustrated example also includes an interface circuit 20. The interface circuit 20 may be implemented by any type of interface standard, such as an Ethernet interface, a universal serial bus (USB), a Bluetooth® interface, a near field communication (NFC) interface, and/or a PCI express interface.

In the illustrated example, one or more input devices 22 are connected to the interface circuit 20. The input device(s) 22 permit(s) a user to enter data and/or commands into the processor 12. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 00, can allow the user to control the computer system and provide data to the computer using physical gestures, such as, but not limited to, hand or body movements, facial expressions, and face recognition.

One or more output devices 24 are also connected to the interface circuit 20 of the illustrated example. The output devices 24 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speakers(s). The interface circuit 20 of the illustrated example, thus, typically includes a graphics driver card, a graphics driver chip and/or a graphics driver processor.

The interface circuit 20 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 26. The communication can be via, for example, an Ethernet connection, a digital subscriber line (DSL) connection, a telephone line connection, a coaxial cable system, a satellite system, a line-of-site wireless system, a cellular telephone system, etc.

The processor platform 00 of the illustrated example also includes one or more mass storage devices 28 for storing software and/or data. Examples of such mass storage devices 28 include floppy disk drives, hard drive disks, compact disk drives, Blu-ray disk drives, redundant array of independent disks (RAID) systems, and digital versatile disk (DVD) drives.

The machine executable instructions 32 corresponding to the instructions of FIGS. 4 and/or 5 may be stored in the mass storage device 28, in the volatile memory 14, in the non-volatile memory 16, in the local memory 13 and/or on a removable non-transitory computer readable storage medium, such as a CD or DVD 36.

Figure 7:
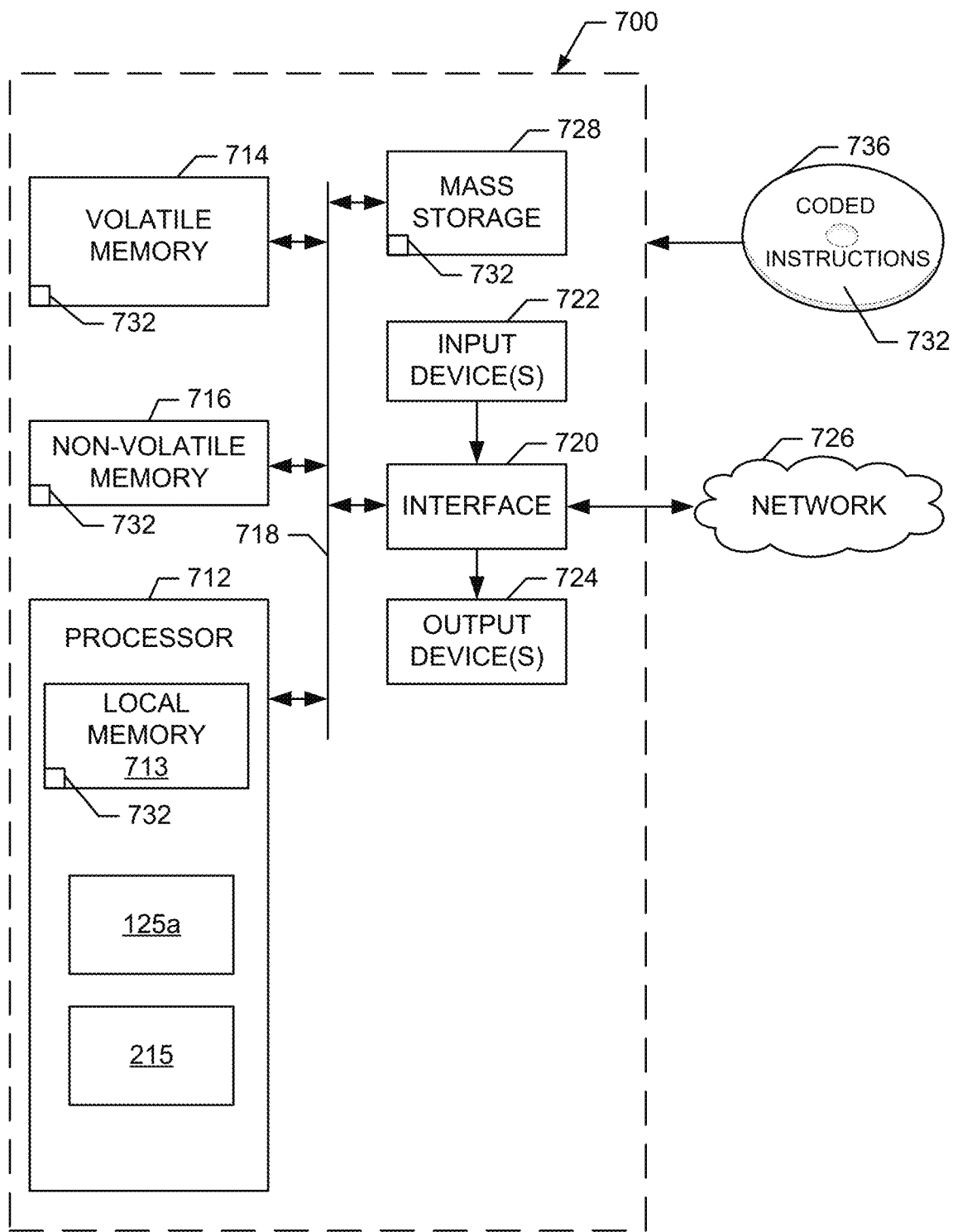
FIG. 7 is a block diagram of an example processor platform structured to execute the example machine readable instructions of FIG. 3 to implement at least portions of the example television audience measurement system of FIG. 2.

FIG. 7 is a block diagram of an example processor platform 700 structured to execute the instructions of FIG. 3 to implement the example watermark encoder 125*a* and the example insertion control logic 215 of the example audience measurement system 200 of FIG. 2. The processor platform 700 can be, for example, a server, a personal computer, a workstation, a self-learning machine (e.g., a neural network), a mobile device (e.g., a cell phone, a smart phone, a tablet such as an iPad™), a PDA, an Internet appliance, a DVD player, a CD player, a digital video recorder, a Blu-ray player, a gaming console, a personal video recorder, a set top box a digital camera, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor 712 may be a semiconductor based (e.g., silicon based) device. In the illustrated example, the processor 712 implements the example watermark encoder 125*a* and the example insertion control logic 215.

The processor 712 of the illustrated example includes a local memory 713 (e.g., a cache). The processor 712 of the illustrated example is in communication with a main memory including a volatile memory 714 and a non-volatile memory 716 via a link 718. The link 718 may be implemented by a bus, one or more point-to-point connections, etc., or a combination thereof. The volatile memory 714 may be implemented by SDRAM, DRAM, RDRAM® and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a USB, a Bluetooth® interface, an NFC interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 700, can allow the user to control the computer system and provide data to the computer using physical gestures, such as, but not limited to, hand or body movements, facial expressions, and face recognition.

One or more output devices 724 are also connected to the interface circuit 720 of the illustrated example. The output devices 724 can be implemented, for example, by display devices (e.g., an LED, an OLED, an LCD, a CRT display, an IPS display, a touchscreen, etc.), a tactile output device, a printer and/or speakers(s). The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a DSL connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The machine executable instructions 732 corresponding to the instructions of FIG. 3 may be stored in the mass storage device 728, in the volatile memory 714, in the non-volatile memory 716, in the local memory 713 and/or on a removable non-transitory computer readable storage medium, such as a CD or DVD 736.

Figure 6:
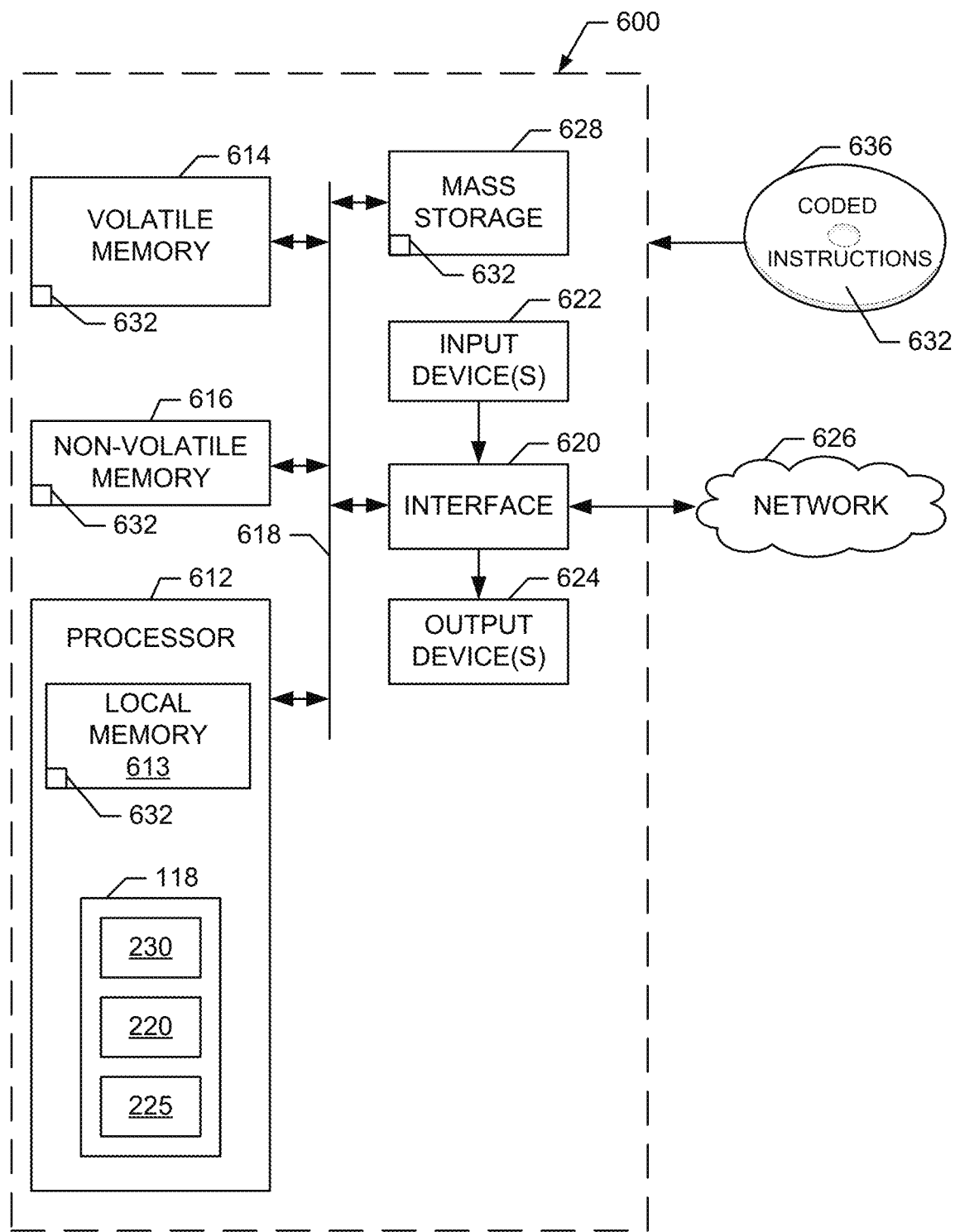
FIG. 6 is a block diagram of an example processor platform structured to execute the example machine readable instructions of FIGS. 4 and/or 5 to implement the example flexible commercial creditor of the example television audience measurement system of FIG. 2.

Thus, in some examples, the flexible commercial detector 220 implements means for detecting whether a watermark decoded from a television broadcast signal is a bridge watermark. The means for detecting whether a watermark decoded from a television broadcast signal is a bridge watermark may also be implemented by a processor, such as the processor 612 of FIG. 6, executing instructions, such as the instructions of FIGS. 4 and/or 5. In some examples, the commercial metric calculator 225 implements means for crediting audience exposure associated with a portion of the television broadcast signal to a flexible commercial crediting metric. The means for crediting audience exposure associated with a portion of the television broadcast signal to a flexible commercial crediting metric may also be implemented by a processor, such as the processor 612 of FIG. 6, executing instructions, such as the instructions of FIGS. 4 and/or 5. In some examples, the watermark encoders 125a-c implement respective means for encoding a bridge watermark into a portion of a television broadcast signal including a flexible commercial. The means for encoding a bridge watermark into a portion of a television broadcast signal including a flexible commercial may also be implemented by a processor, such as the processor 712 of FIG. 7, executing instructions, such as the instructions of FIG. 3. In some examples, the insertion control logic 215 implements means for determining whether to encode a bridge watermark. The means for determining whether to encode a bridge watermark may also be implemented by a processor, such as the processor 712 of FIG. 7, executing instructions, such as the instructions of FIG. 3.

From the foregoing, it will be appreciated that example methods, apparatus and articles of manufacture have been disclosed that implement flexible commercial monitoring for television audience measurement. The disclosed methods, apparatus and articles of manufacture improve the efficiency of a computing device included in a television audience measurement system to differentiate between flexible commercials (e.g., dynamically inserted advertisements, locally targeted advertisements, etc.) and other types of media spots (e.g., national commercials, promotional spots, etc.) inserted in programming content. Disclosed examples introduce a new type of media watermark and associated decision logic to facilitate such discrimination between flexible commercial and other types of media. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A computing system comprising:
 a processor; and
 a non-transitory computer-readable storage medium, having stored thereon program instructions that, upon execution by the processor, cause performance of a set of operations comprising:
  identifying a bridge watermark in metering data,
   wherein a bridge watermark indicates that a distributor inserted at least one commercial into media content at a flexible insertion location; and
  crediting, based on identifying the bridge watermark, audience exposure to a flexible commercial crediting metric.

2. The computing system of claim 1, the set of operations further comprising:
 identifying a timestamp associated with the bridge watermark; and
 wherein crediting, based on identifying the bridge watermark, audience exposure to the flexible commercial crediting metric comprises using the timestamp to identify when the bridge watermark occurred in the media content.

3. The computing system of claim 1, the set of operations further comprising:
 identifying a type value associated with the bridge watermark, wherein the type value is associated with the distributor.

4. The computing system of claim 1, wherein identifying a bridge watermark in metering data comprises identifying a type value, wherein the type value is associated with the distributor.

5. The computing system of claim 1, the set of operations further comprising:
 identifying a commercial watermark in the metering data,
  wherein the commercial watermark identifies a commercial of the at least one commercial inserted into the flexible insertion location, and
  wherein the commercial watermark and the bridge watermark differ.

6. The computing system of claim 5, the set of operations further comprising:
 crediting, based on identifying the commercial watermark, audience exposure to a commercial crediting metric.

7. The computing system of claim 6, wherein the commercial watermark is embedded in the commercial in a first watermarking layer, and wherein the bridge watermark is embedded in the commercial in a second watermarking layer, different than the first watermarking layer.

8. A non-transitory computer-readable storage medium, having stored thereon program instructions that, upon execution by a processor, cause performance of a set of operations comprising:
 identifying a bridge watermark in metering data,
  wherein a bridge watermark indicates that a distributor inserted at least one commercial into media content at a flexible insertion location; and
 crediting, based on identifying the bridge watermark, audience exposure to a flexible commercial crediting metric.

9. The non-transitory computer-readable storage medium of claim 8, the set of operations further comprising:
 identifying a timestamp associated with the bridge watermark; and wherein crediting, based on identifying the bridge watermark, audience exposure to the flexible commercial crediting metric comprises using the timestamp to identify when the bridge watermark occurred in the media content.

10. The non-transitory computer-readable storage medium of claim 8, the set of operations further comprising:
identifying a type value associated with the bridge watermark, wherein the type value is associated with the distributor.

11. The non-transitory computer-readable storage medium of claim 8, wherein identifying a bridge watermark in metering data comprises identifying a type value, wherein the type value is associated with the distributor.

12. The non-transitory computer-readable storage medium of claim 8, the set of operations further comprising:
identifying a commercial watermark in the metering data,
wherein the commercial watermark identifies a commercial of the at least one commercial inserted into the flexible insertion location, and
wherein the commercial watermark and the bridge watermark differ.

13. The non-transitory computer-readable storage medium of claim 12, the set of operations further comprising:
crediting, based on identifying the commercial watermark, audience exposure to a commercial crediting metric.

14. The non-transitory computer-readable storage medium of claim 13, wherein the commercial watermark is embedded in the commercial in a first watermarking layer, and wherein the bridge watermark is embedded in the commercial in a second watermarking layer, different than the first watermarking layer.

15. A method comprising:
identifying a bridge watermark in metering data,
wherein a bridge watermark indicates that a distributor inserted at least one commercial into media content at a flexible insertion location; and
crediting, based on identifying the bridge watermark, audience exposure to a flexible commercial crediting metric.

16. The method of claim 15, further comprising:
identifying a timestamp associated with the bridge watermark; and
wherein crediting, based on identifying the bridge watermark, audience exposure to the flexible commercial crediting metric comprises using the timestamp to identify when the bridge watermark occurred in the media content.

17. The method of claim 15, further comprising:
identifying a type value associated with the bridge watermark, wherein the type value is associated with the distributor.

18. The method of claim 15, wherein identifying a bridge watermark in metering data comprises identifying a type value, wherein the type value is associated with the distributor.

19. The method of claim 15, further comprising:
identifying a commercial watermark in the metering data,
wherein the commercial watermark identifies a commercial of the at least one commercial inserted into the flexible insertion location, and
wherein the commercial watermark and the bridge watermark differ.

20. The method of claim 19, further comprising:
crediting, based on identifying the commercial watermark, audience exposure to a commercial crediting metric.

* * * * *